(12) United States Patent
Colonico

(10) Patent No.: US 7,022,278 B2
(45) Date of Patent: Apr. 4, 2006

(54) VALVE PIN LOCKING MECHANISM

(75) Inventor: Gino Colonico, Georgetown (CA)

(73) Assignee: Mold-Masters Limited, Ontario (CA)

( * ) Notice: Subject to any disclaimer, the term of this patent is extended or adjusted under 35 U.S.C. 154(b) by 345 days.

(21) Appl. No.: 10/361,698

(22) Filed: Feb. 11, 2003

(65) Prior Publication Data

US 2003/0151165 A1 Aug. 14, 2003

(30) Foreign Application Priority Data

Feb. 11, 2002 (CA) .................................. 2371346

(51) Int. Cl.
B29C 45/23 (2006.01)
B29C 45/38 (2006.01)

(52) U.S. Cl. .................... 264/328.8; 425/564; 425/572

(58) Field of Classification Search ............. 264/328.1, 264/328.8; 425/562, 572, 564, 573, 570, 425/588
See application file for complete search history.

(56) References Cited

U.S. PATENT DOCUMENTS

| | | | |
|---|---|---|---|
| 3,037,245 A | 6/1962 | Darnell | |
| 3,571,856 A * | 3/1971 | Voelker | 425/145 |
| 4,212,627 A * | 7/1980 | Gellert | 425/564 |
| 4,337,027 A * | 6/1982 | Montieth | 425/562 |
| 4,446,360 A | 5/1984 | Gellert | |
| 4,609,138 A | 9/1986 | Harrison | |
| 4,698,013 A | 10/1987 | Butcher | |
| 4,740,151 A | 4/1988 | Schmidt et al. | |
| 5,080,575 A * | 1/1992 | Berg et al. | 425/564 |
| 5,141,696 A | 8/1992 | Osuna-Diaz | |
| 5,208,053 A * | 5/1993 | Vandenberg | 425/572 |
| 5,556,582 A | 9/1996 | Kazmer | |
| 5,780,077 A | 7/1998 | von Holdt | |
| 6,214,275 B1 | 4/2001 | Catoen et al. | |
| 6,228,309 B1 | 5/2001 | Jones et al. | |

FOREIGN PATENT DOCUMENTS

| | | |
|---|---|---|
| CA | 1238161 | 6/1988 |
| DE | 40 32 499 A | 4/1992 |
| FR | 2 537 497 A | 6/1984 |

* cited by examiner

*Primary Examiner*—Jill H. Heitbrink
(74) *Attorney, Agent, or Firm*—Sterne, Kessler, Goldstein & Fox P.L.L.C.

(57) ABSTRACT

A locking mechanism for locking a valve pin of a nozzle of an injection molding apparatus in an extended position includes a generally oblong detent coupled to a pin. The pin extends through an aperture located at a first end of the detent to secure the detent to an inner wall of a recess, which is located adjacent the piston-receiving cavity of the valve pin. The detent is pivotable about the pin to rotate a second end of the detent into abutment with a return surface of the piston to restrict movement of the valve pin.

17 Claims, 4 Drawing Sheets

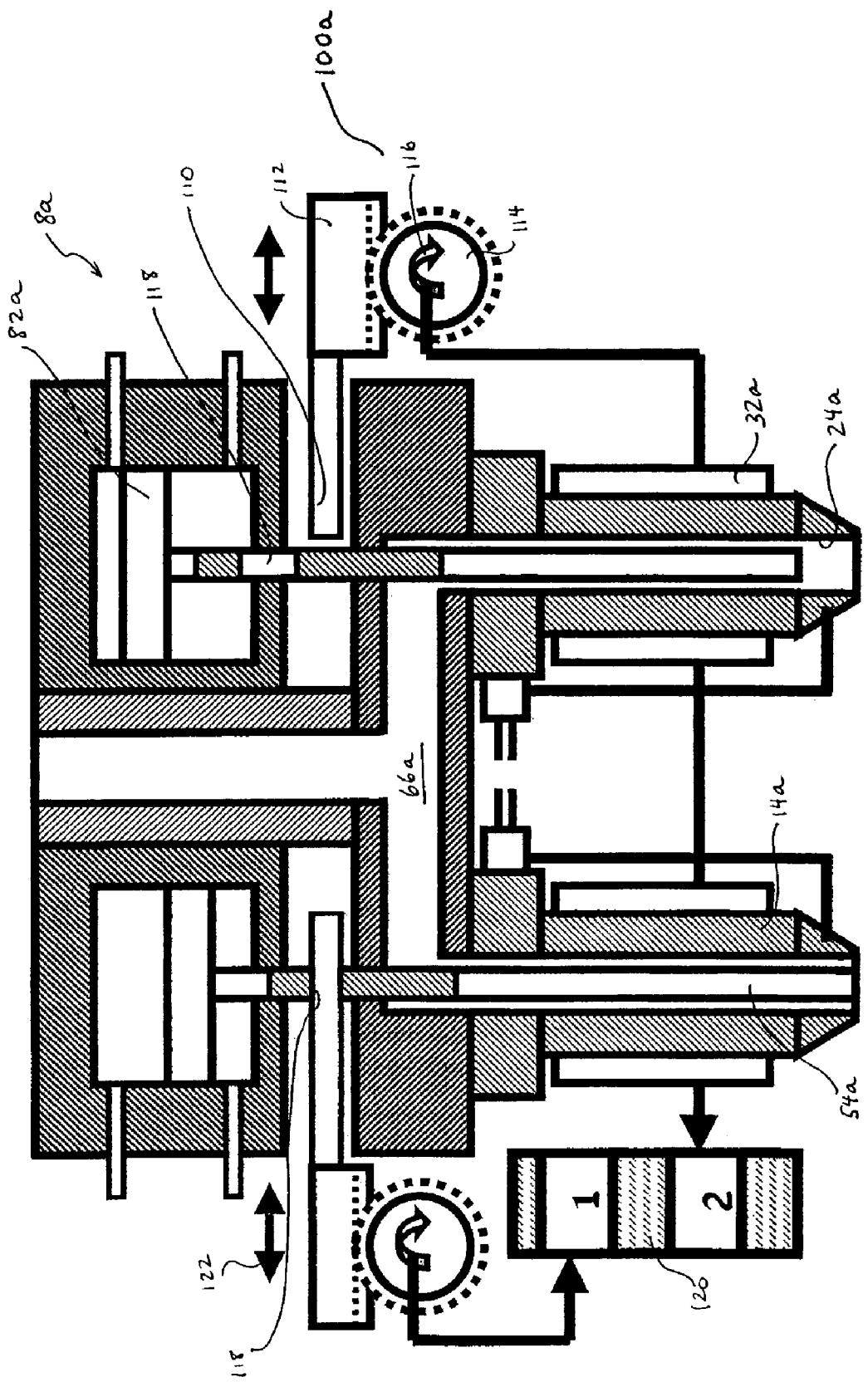

VALVE PIN LOCKING MECHANISM

BACKGROUND OF THE INVENTION

Field of the Invention

The present invention relates generally to an injection molding apparatus and, in particular, to a locking mechanism for a valve pin to restrict the flow of melt to a selected mold cavity.

Multi-cavity molds are known. Hot runner valve gated nozzles are also known. Reference is made to U.S. Pat. No. 4,698,013. Valve gated nozzles are typically used in mold applications in which the quality requirements for the molded parts are high and when the size of the mold gate is above a certain size.

In order to increase the output of an injection molding system, arrays of mold cavity spaces are used in conjunction with several valve gated nozzles. Due to the unstable or unpredictable molding conditions, some cavities or some nozzles have a different behavior than the others. This means that the parts made in these cavities do not meet certain criteria. It may also happen that due to some assembling errors either the nozzles or the cavities can be locally or totally damaged. It may also happen that local drooling or local leak of molten material may happen more often or permanently at some gates or nozzles. In each of these cases there is a need to stop the molding process in all nozzles and cavities and then fix the problem. This means that for a certain amount of time the entire mold is not operable and this results in a total loss of output. There is a need to solve this problem more efficiently whenever it appears in order to lower the loss of molded parts when a certain cavity or nozzle presents a problem.

It is therefore an object of the present invention to provide a locking mechanism for a valve pin that obviates or mitigates at least one of the above disadvantages.

SUMMARY OF THE INVENTION

According to one aspect of the present invention there is provided an injection molding apparatus comprising:
- a manifold having a manifold channel for receiving a melt stream of moldable material under pressure and delivering the melt stream to a nozzle having a nozzle channel, the nozzle channel communicating with an outlet of the manifold channel to receive the melt stream;
- a mold cavity receiving the melt stream from the nozzle, the nozzle channel communicating with the mold cavity through a mold gate;
- a valve pin extending through the nozzle channel, the valve pin being movable by a piston between a retracted position and an extended position, the mold gate being closed when the valve pin is in the extended position; and
- a locking mechanism in communication with the valve pin, the locking mechanism being selectively actuatable to lock the valve pin in an extended position.

According to another aspect of the present invention there is provided an injection molding apparatus comprising:
- a manifold having a manifold channel for receiving a melt stream of moldable material under pressure;
- a plurality of nozzles having nozzle channels, the nozzle channels communicating with outlets of the manifold channel to receive the melt stream;
- a plurality of mold cavities receiving the melt stream from the plurality of nozzles, the nozzle channels of the plurality of nozzles communicating with the plurality of mold cavities through a plurality of mold gates;
- a plurality of valve pins extending through the plurality of nozzles, the plurality of valve pins being actuatable by pistons to selectively open and close the plurality of mold gates; and
- a plurality of locking mechanisms cooperating with the plurality of valve pins for selectively locking the valve pins in a position in which at least one of the plurality of mold gates is closed.

The present invention provides an advantage in that any one of a plurality of nozzles of an injection molding apparatus can be shut off without interrupting the molding process for the entire apparatus.

BRIEF DESCRIPTION OF THE DRAWINGS

Embodiments of the present invention will now be described more fully with reference to the accompanying drawings in which like reference numerals represent like parts.

FIG. 4 is schematic sectional view of a further embodiment of a multi-cavity valve gated injection molding system of the present invention.

DETAILED DESCRIPTION OF THE PREFERRED EMBODIMENT

Figure 1:
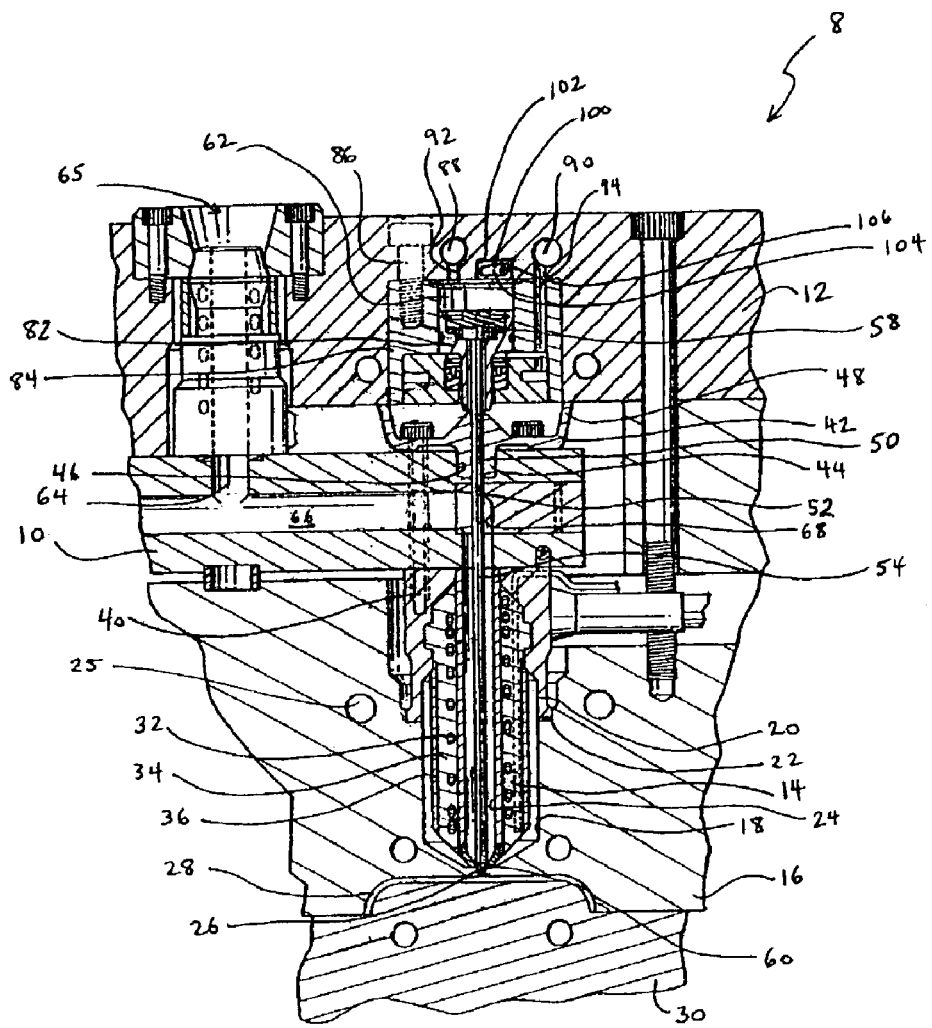
FIG. 1 is a sectional view of a portion of a multi-cavity valve gated injection molding system according to the present invention.

Referring now to FIG. 1, parts of a multi-cavity injection molding apparatus 8 in which a manifold 10 extends between a mold back plate 12 and a number of heated nozzles 14 seated in a cavity plate 16 is shown. The multi-cavity injection molding apparatus is similar to that disclosed in U.S. Pat. No. 4,698,013, the contents of which are herein incorporated by reference. Each nozzle 14 is located in a well 18 in the cavity plate 16 by a locating bushing portion 20 which seats on a shoulder 22 in the well. Each nozzle 14 has a central bore 24, or nozzle channel, in alignment with a gate 26 which leads to a mold cavity 28 between the cavity plate 16 and a movable mold platen 30. In this embodiment, the heated nozzles 14 have a helical electrical heating element 32 cast in a beryllium copper portion 34 between a stainless steel outer portion 36 and a stainless steel inner portion which forms the central bore 24. Manufacture of these nozzles 14 is described in more detail in U.S. Pat. No. 4,446,360 to Gellert entitled "Sprue Bushing Connector Assembly" which issued May 1, 1984, the contents of which are herein incorporated by reference. Cooling channels 25 are located in the cavity plate and mold platen.

Each nozzle 14 is fixed to the manifold 10 by bolts 40 which also secure a sealing and retaining bushing 42 to the other side of the manifold as described in more detail in U.S.

Pat. No. 4,740,151 entitled "Sealing and Retaining Bushing for Injection Molding" that issued on Apr. 26, 1988, the contents of which are herein incorporated by reference. The sealing and retaining bushing 42 has a collar portion 44 which is seated in a well 46 in the manifold and an outer flanged portion 48 which contacts the mold back plate 12 during operation. The bushing 42 is located with its central bore 50 in alignment with a transverse bore portion 52 through the manifold and with the central bore 24 of the nozzle. An elongated valve pin 54 having a driven end with an enlarged head 58 and a tapered tip end 60 extends through the aligned central bore 50 of the bushing 42, the transverse bore 52 through the manifold 10, and the central bore 24 of the nozzle 14. The driven end of the valve pin 54 is connected to actuating mechanism 62 seated in the mold back plate 12 which is described in more detail below. The actuating mechanism 62 reciprocates the valve pin 54 between a retracted open position and a closed position in which the tip end 60 is seated in the gate 26.

A melt passage 64 extends through a heated sprue bushing 65 which receives pressurized melt from a molding machine (not shown) to the manifold 10 where it branches out through a manifold channel 66. The sprue bushing 65 in this embodiment is made by the method described in Gellert's Canadian patent application Ser. No. 496,645 entitled "Manufacturing Method for Selected Gate Configuration Injection Molding Nozzles" filed Dec. 2, 1985, the contents of which are herein incorporated by reference. The manifold channel 66 connects to an enlarged portion 68 of the transverse bore 52 through the manifold and extends through the enlarged portion 68 of the transverse bore 52 and through the central bore 24 through the nozzle around the valve pin 54 to the gate 26. A machined plug 68 is brazed into the manifold 10 to provide a smooth joint between them as described in the applicant's U.S. Pat. No. 4,609,138 entitled "Method of Manufacturing Injection Molding Manifold with Plugs" which issued Sep. 2, 1986, the contents of which are herein incorporated by reference.

The actuating mechanism 62 includes a piston 82 that reciprocates in a cylinder 84 having a piston-receiving cavity to drive the valve pin 54. The cylinder 84 is seated in the mold back plate 12 and secured in position by bolts 86. In this embodiment, the actuating mechanism 62 is hydraulic, however, it will be appreciated by a person skilled in the art that a pneumatically operated actuating mechanism 62 could be used. Hydraulic fluid lines 88,90 extend through the mold back plate 12 and are connected by ducts 92,94 to the cylinder 84 on opposite sides of the piston 82. Controlled fluid pressure is applied to reciprocate the piston and valve pin according to a predetermined cycle in a conventional manner.

Figure 3:
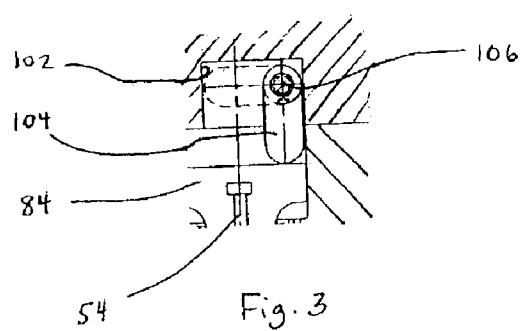
FIG. 3 is an enlarged view of a portion of FIG. 1.

According to one embodiment of the present invention, a locking mechanism 100, best shown in FIG. 3, is nested in a recess 102 that is provided in the mold back plate 12 of the injection molding apparatus 8. The recess 102 is located adjacent the piston 82 of the actuating mechanism 62 and communicates therewith. The locking mechanism 100 includes a bar, or detent, 104 that is pivotally coupled to the mold back plate 12 by a pin 106. The bar 104 is generally rectangular in shape having rounded ends. A distal end of the bar 104 abuts a return surface of the piston 82 to maintain the piston 82 in a position in which the mold gate 26 is blocked by the valve pin 54.

The locking mechanism 100 is manually actuatable by a handle (not shown) that is coupled to a rod (not shown), which extends from the locking mechanism 100 to the exterior of the injection molding apparatus 8. The rod is rotatable from a first position, in which the bar 104 is fully contained within recess 102 to a second position, in which the distal end of the bar 104 abuts the piston 82 to maintain the piston 82 in a fully extended position. Each nozzle 14 has a locking mechanism 100 to control the movement of the respective valve pin 54.

The locking mechanisms 100 are preferably actuated from the front or more likely from either side of the mold plates 30. This allows the operator to actuate any of the locking mechanisms without removing the nozzles 14 or the mold plates 30 from their operable positions.

Figure 2:
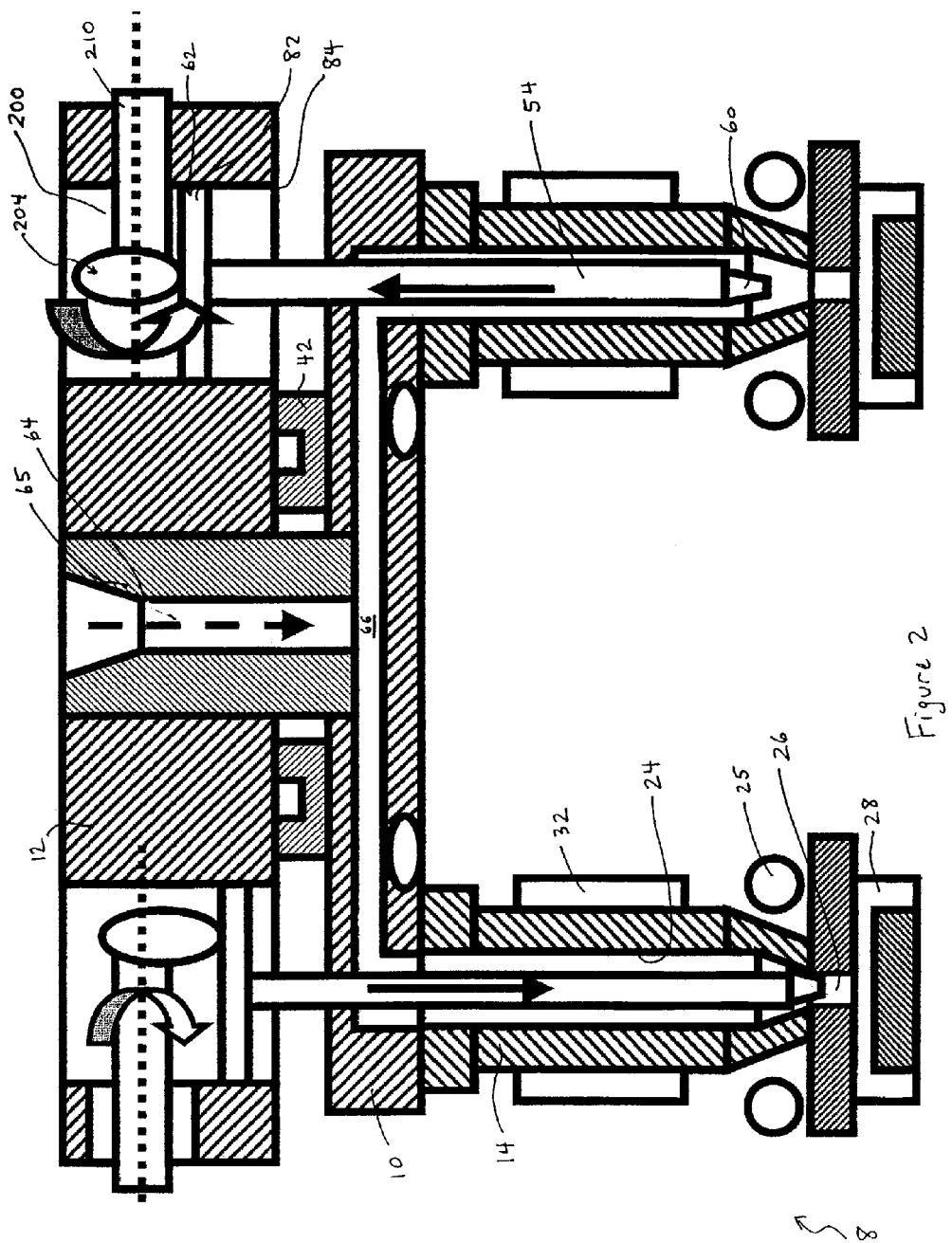
FIG. 2 is a schematic sectional view of a further embodiment of a multi-cavity valve gated injection molding system of the present invention.

A further embodiment is shown in FIG. 2. The embodiment of FIG. 2 is similar to FIG. 1, however, the actuating mechanism 62 is pneumatically operated. As can be seen from the parts of the pneumatically operated actuating mechanism 62 that are shown, air enters the actuating mechanism 62 through a rod 210 to move the valve pin 54 into the extended position in which the mold gate 26 is closed. In addition, the locking mechanism 200 is similar to the locking mechanism 100 of FIG. 1, however, the detent 204 is located inside the cylinder 84 of the actuating mechanism 62 and rod 210 is used to actuate the locking mechanism 200.

In use, hot pressurized melt is introduced into the sprue bushing 65 from a molding machine (not shown) and flows through the manifold melt channel 66. Controlled hydraulic fluid pressure, or pneumatic pressure, is applied to the fluid lines 88,90 and ducts 92,94 to control simultaneous actuation of the valve pins 54 according to a predetermined cycle in a conventional manner. With the valve pins 54 in the retracted open position, the melt flows through the nozzle channels 24 to the gates 26 and into the cavities 28. When the cavities 28 are full, the pressure is held momentarily to pack. The hydraulic pressure is then applied to reciprocate the valve pins 54 to the closed position with each tip end 60 seated in one of the gates 26. The injection pressure is then reduced and the position held for a short cooling period before the mold opens for ejection. After the mold is closed again the hydraulic pressure is applied to withdraw the valve pins to the open position and the melt injection pressure is reapplied to refill the cavities. This cycle is repeated continuously every few seconds depending upon the size and shape of the cavities and the type of material being molded.

During the above described cycle, the quality of the molded products is controlled visually or by using various automated indicating devices. At any point during the cycle, an operator may actuate the locking mechanism 100 in response to visual or automated quality indicators that indicate that one or several of the valve gated nozzles 14 or mold cavities 28 are behaving in an unusual manner. To actuate the locking mechanism 100, the operator rotates the rod associated with the affected nozzle 14. The bar 104 swings approximately 90 degrees into abutment with the piston 82 to lock the valve pin 54 in an extended position in which the mold gate 26 is closed.

The production run is allowed to continue with one or more nozzles 14 not operating, which is important because interrupting the molding process can result in a significant loss of output due to the short cycle time, which is typically a few seconds long. Once the production run has completed, or the injection molding apparatus 8 shut down, the problem with the nozzle 14 or cavity 28 can be remedied.

The locking mechanism 100 may alternatively be automatically actuated in response to the automated quality indicators of the molded products of each individual mold cavity 28

Turning now to FIG. 4, a further embodiment of an injection molding apparatus 8a is shown. Locking mechanism 100a includes a rod 110 that is mounted to a rack 112. The rack 112 is driven by pinion 114 that is rotatable, as indicated by arrow 116. The rod 110 is movable in the direction indicated by arrow 122. A valve pin 54a has a bore 118 that extends therethrough. The bore 118 is sized to receive the rod 110. A control panel 120 communicates with each locking mechanism 100a. The control panel 120 directs the rack 114 of each locking mechanisms 100a to be actuated based on quality indicator input that is received at the control panel.

If the control panel 120 receives unusual indicator input for a particular nozzle or nozzles 14a, the control panel will signal the locking mechanism 100a to actuate the pinion 114. The pinion 114 will rotate to move the rod 110, which is mounted to the rack 112, toward the valve pin 54a. When the valve pin 54a is in the fully extended position and the mold gate 26 is closed, the rod 110 engages the bore 118 to lock the valve pin 54a in the closed position.

In an alternative embodiment, an operator manually pushes a button on the control panel 120 to remotely activate the pinion 114.

In a further alternative embodiment, an operator directly actuates the pinion 114, which is manually accessible from one side of the mold.

Figure 5:
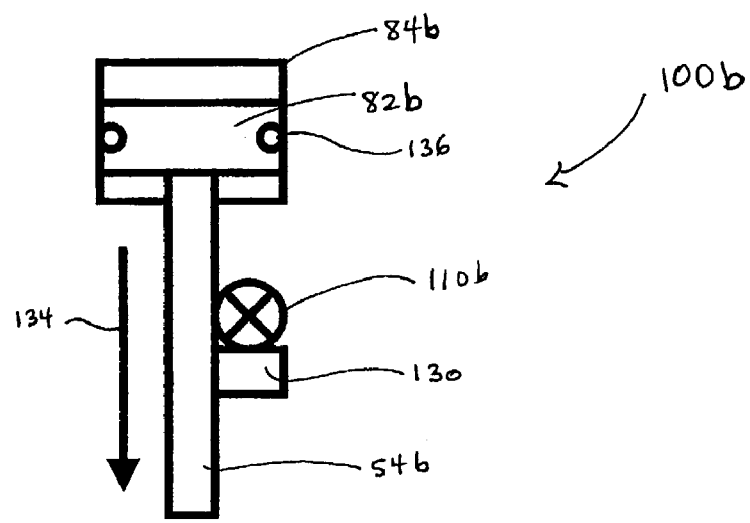
FIG. 5 is a schematic front view of portions of still a further embodiment of a multi-cavity valve gated injection molding system of the present invention.
Figure 6:
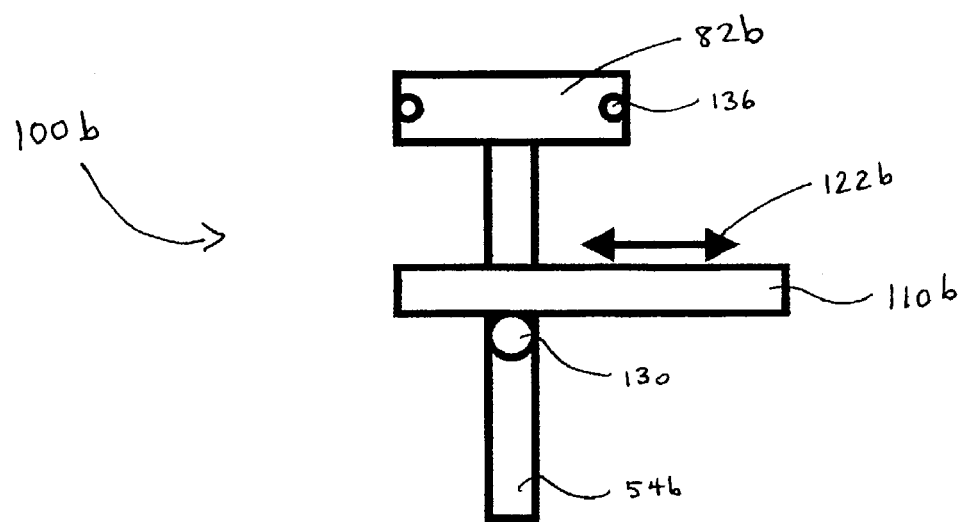
FIG. 6 is a schematic side view of the embodiment of FIG. 5.

Referring now to FIGS. 5 and 6, a further embodiment of locking mechanism 100b for an injection molding apparatus is shown. In this embodiment, a valve pin 54b includes a projection 130 that extends outwardly therefrom. As has been previously described, the valve pin 54b is actuatable by a piston 82b in the direction of arrow 134 to close a mold gate (not shown). The piston 82b includes an o-ring 136 to provide a seal as the piston 82b travels within cylinder 84b. A rod 110b, which may be driven in a similar manner as has been previously described in relation to FIG. 4, is movable in the direction indicated by arrow 122b into and out of contact with the projection 130.

In use, the rod 110b is manually or automatically movable to block the retracting movement of the valve pin 54b. The projection 130 abuts the rod 110b and the valve pin 54b is held in the mold gate 26 to maintain it in a closed position. The rod and projection are both shown as having a circular cross-section, however, the cross-sections may be any suitable shape.

It will be appreciated by a person skilled in the art that the locking mechanism 100 may be any mechanical device that selectively blocks the movement of a valve pin 54 in an injection molding apparatus 8.

Although preferred embodiments of the present invention have been described, those of skill in the art will appreciate that variations and modifications may be made without departing from the spirit and scope thereof as defined by the appended claims.

What is claimed is:

1. An injection molding method comprising the steps of:
   injecting a molten material through a plurality of valve gated nozzles;
   moving a valve pin through each of said plurality of nozzles between a retracted position and an extended position; and
   locking at least one valve pin in said extended position by setting a locking mechanism into a single engaged position, wherein the locking mechanism acts on the valve pin to thereby close a mold gate, while at least another valve pin is in said retracted position.

2. An injection molding method as defined in claim 1, wherein said locking step further includes manually actuating the locking mechanism to thereby lock the valve pin in the extended position.

3. An injection molding method as defined in claim 2, wherein said locking mechanism is manually actuated by turning a handle extending from the locking mechanism, to thereby lock the valve pin in the extended position.

4. An injection molding method as defined in claim 1, wherein said locking step further includes automatically actuating the locking mechanism, by means of an automatic control panel, to thereby lock the valve pin in the extended position.

5. An injection molding method as defined in claim 1, further comprising:
   examining a molded article; and
   determining whether the molded article meets pre-set standards,
   wherein said locking step is performed on the valve gated nozzle which injected the molten material that created the molded article, if the molded article does not meet the pre-set standards.

6. An injection molding method as defined in claim 5, wherein said locking step is performed by manually actuating the locking mechanism by turning a handle extending from the locking mechanism.

7. An injection molding method as defined in claim 5, wherein said locking step is performed by automatically actuating the locking mechanism, by means of an automatic control panel, to thereby lock the valve pin in the extended position.

8. An injection molding apparatus comprising:
   a manifold having a manifold channel for receiving a melt stream of moldable material under pressure and delivering said melt stream to a nozzle having a nozzle channel, said nozzle channel communicating with an outlet of said manifold channel to receive said melt stream;
   a mold cavity receiving said melt stream from said nozzle, said nozzle channel communicating with said mold cavity through a mold gate;
   a valve pin extending at least partially through said nozzle channel, said valve pin being movable by a piston between a retracted position and an extended position, said mold gate being closed when said valve pin is in said extended position; and
   a locking mechanism adapted to be placed in one of only two settings, a first setting being in a disengaged position wherein the locking mechanism does not act on the valve pin, and a second setting being in an engaged position wherein the locking mechanism locks said valve pin in said extended position.

9. The injection molding apparatus as claimed in claim 8, wherein said locking mechanism engages the piston in said extended position.

10. The injection molding apparatus as claimed in claim 8, wherein said locking mechanism engages the valve pin in said extended position.

11. The injection molding apparatus as claimed in claim 9, wherein said locking mechanism comprises:
   a detent having a first end and a second end; and
   a pin for coupling said detent wherein said detent is pivotable to rotate said second end of said detent into abutment with said piston to lock said valve pin in an extended position.

12. The injection molding apparatus as claimed in claim 11, wherein a handle is in communication with said pin for actuating said detent.

13. The injection molding apparatus as claimed in claim 8, wherein said locking mechanism includes a detent, said detent being actuatable to selectively communicate with a return surface of said piston to lock said valve pin in an extended position.

14. The injection molding apparatus as claimed in claim 8, wherein said locking mechanism includes a rod, said rod being actuatable to selectively communicate with an upstream surface of a valve pin projection, said valve pin projection extending outwardly from said valve pin between an enlarged head of said valve pin and a tip of said valve pin, wherein interaction between said rod and said valve pin projection locks said valve pin in said extended position.

15. The injection molding apparatus as claimed in claim 8, wherein said locking mechanism includes a rod, said rod being actuatable to selectively communicate with an aperture provided in said valve pin, said aperture being located between an enlarged head of said valve pin and a tip of said valve pin, wherein interaction between said rod and said aperture of said valve pin locks said valve pin in said extended position.

16. An injection molding apparatus having a mold gate, comprising:
a manifold having a manifold channel;
a nozzle coupled to the manifold and having a nozzle channel in fluid communication with the manifold channel;
a valve pin extending through the nozzle channel;
an actuating mechanism coupled to the valve pin and adapted to move the valve pin between a retracted position, wherein the mold gate is open, and an extended position, wherein the mold gate is closed by the valve pin;
a locking mechanism adapted to lock the valve pin in the extended position;
a control panel coupled to the locking mechanism and adapted to actuate the locking mechanism by setting the locking mechanism in one of only two settings, wherein a first setting is in a disengaged position wherein the locking mechanism does not act on the valve pin, and a second setting is in an engaged position wherein the locking mechanism locks the valve pin in the extended position.

17. An injection molding apparatus as defined in claim 16, wherein the control panel is configured to receive inputs indicative of the quality of a molded article.

* * * * *